(12) United States Patent
Chiang et al.

(10) Patent No.: US 7,288,849 B1
(45) Date of Patent: Oct. 30, 2007

(54) GRAVITATIONAL ELECTRIC POWER GENERATING DEVICE

(76) Inventors: Chin-Hui Chiang, No. 295, Sec. 5, Roosevelt Road, Taipei (TW); Hsin-Jung Chiang, No. 295, Sec. 5, Roosevelt Road, Taipei (TW)

( * ) Notice: Subject to any disclaimer, the term of this patent is extended or adjusted under 35 U.S.C. 154(b) by 0 days.

(21) Appl. No.: 11/553,476

(22) Filed: Oct. 27, 2006

(51) Int. Cl.
*F03G 5/02* (2006.01)

(52) U.S. Cl. .................................................. 290/1 R
(58) Field of Classification Search ............... 290/1 R
See application file for complete search history.

(56) References Cited

U.S. PATENT DOCUMENTS

| | | | |
|---|---|---|---|
| 3,987,307 A * | 10/1976 | Giconi | 290/1 D |
| 4,389,047 A * | 6/1983 | Hall | 482/2 |
| 5,224,568 A * | 7/1993 | Kennon | 185/19 |
| 5,243,224 A * | 9/1993 | Tagney, Jr. | 290/1 R |
| 5,252,859 A * | 10/1993 | Tagney, Jr. | 290/1 R |
| 6,365,981 B1 * | 4/2002 | Tokita | 290/1 R |
| 6,946,748 B2 * | 9/2005 | Love | 290/1 C |

FOREIGN PATENT DOCUMENTS

| | | | |
|---|---|---|---|
| FR | 2488338 A | * | 2/1982 |
| WO | WO 9109226 A1 | * | 6/1991 |
| WO | WO 2004056710 A1 | * | 7/2004 |

* cited by examiner

*Primary Examiner*—Joseph Waks

(57) ABSTRACT

A gravitational electric power generating device includes a driving shaft, at least a spinning wheel, and two mount assemblies, in which each of the spinning wheels includes a first spoke rim, a second spoke rim, a wheel hub, and at least a tread-wheel. The two mount assemblies are erected at the two ends of the driving shaft, respectively, and can support both the driving shaft and the spinning wheel on the driving shaft. Using a moving object to move in the tread-wheel, and making use of the gravitational effect of the moving object, the spinning wheel is able to drive the driving shaft to rotate. The mount assemblies have a power conversion module, which is connected to an electric generator. The rotational inertia of the driving shaft is transmitted to the electric generator to generate the electric power using the power conversion module.

6 Claims, 9 Drawing Sheets

GRAVITATIONAL ELECTRIC POWER GENERATING DEVICE

BACKGROUND OF THE INVENTION

1. Field of the Invention

The present invention relates to a gravitational electric power generating device, and especially to an electric power generating device making use of animals or moving objects, gravitational force, and lever principle to generate electricity, which has lower cost, higher generating capacity and optimal environmental protection benefits.

2. The Prior Arts

The conventional electricity generation methods mostly are, for example, hydraulic power generation, thermal power generation, wind power generation, solar energy electricity generation, or nuclear power electricity generation. As is well-known, the cost of building a hydroelectric power plant is very high, and the environmental conditions/factors can affect the generating capacity of the entire plant. The thermal electric power plant produces exhaust fumes in combustion and results in environmental pollution, which is an extremely severe problem. In addition, the thermal electric power plant also has high construction costs. For the wind power generation option, the cost is lower but the environmental factors can affect it and the generating capacity is limited. The cost for the solar energy electricity generation is lower and the corresponding method of electricity generation is keen on environmental protection, but the generating capacity is insufficient and the rate of electricity generation is easily affected by environmental factors. For the nuclear power electric plant, although the generating capacity is very large, its construction cost is relatively high and the corresponding method of generating electricity and having waste materials with radiation pollution problems. Basically, the conventional electricity generation methods have problems of higher cost, higher pollution, having limited generating capacity, or prone to be affected by environmental factors. Therefore, the following are offered as an improvement technique for overcoming the aforementioned issues.

SUMMARY OF THE INVENTION

A primary objective of the present invention is to provide a gravitational electric power generating device making use of animals or moving objects, gravitational force, and lever principle to generate electricity, which has lower cost, higher generating capacity, and optimal environmental protection benefits.

To achieve the above-mentioned objective, a gravitational electric power generating device in accordance with the present invention includes at least a spinning wheel and two mount assemblies. Each of the spinning wheels has a first spoke rim, a second spoke rim, a wheel hub, and at least a tread-wheel. The first spoke rim and the second spoke rim are separately disposed at the outermost sides of the tread-wheel. The wheel hub is located between the first spoke rim and the second spoke rim and is disposed in the center of the two spoke rims. The wheel hub has a holding device and is wrapped on the driving shaft in a rotating manner. The two mount assemblies are erected at the two ends of the driving shaft, respectively, for supporting the driving shaft and the spinning wheel on the driving shaft. The holding device of the wheel hub can clamp the driving shaft. When the holding device is in an unclamping state, the spinning wheel can rotate around the driving shaft freely. When the holding device is in the clamping state, the spinning wheel can drive the driving shaft to rotate simultaneously. Using a moving object, which has a certain amount of weight, to move in the tread-wheel of the spinning wheel, and making use of the gravitational effect of the moving object, the spinning wheel is able to drive the driving shaft to rotate. The mount assemblies have a power conversion module, which is connected to an electric generator. The rotational inertia of the driving shaft is transmitted to the electric generator to generate the electric power using the power conversion module. The front draw-gate and the back draw-gate are set up on the tread-wheel at a plurality of predetermined positions. The moving object is an animal or a motor vehicle. The wheel hub has a positioning device to position the animal or the motor vehicle at a most proper moving position, and to entice the animal to move forward. The gravitational electric power generating device has many magnetic floating parts, which are separately disposed on the tread-wheel and the driving shaft.

For those skilled in the art can understand the object, the character and the effect of the present invention, illustrate embodiment(s) of the invention and together with attached drawings serve to explain the principle of the invention.

BRIEF DESCRIPTION OF THE DRAWINGS

The present invention will be apparent to those skilled in the art by reading the following detailed description of a plurality of preferred embodiments thereof, with reference to the attached drawings, in which.

DETAILED DESCRIPTION OF PREFERRED EMBODIMENTS

Figure 1:
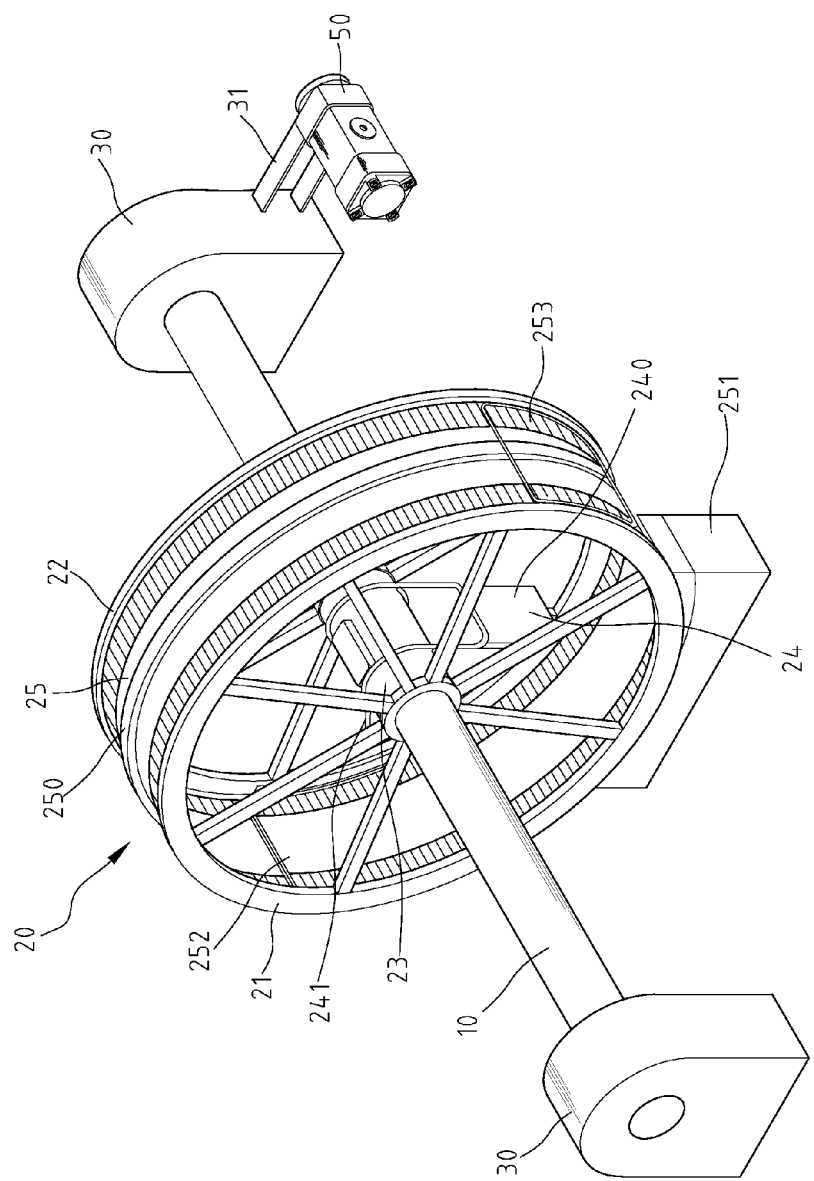
FIG. 1 is a perspective view of a gravitational electric power generating device according to a first preferred embodiment of the present invention.
Figure 2:
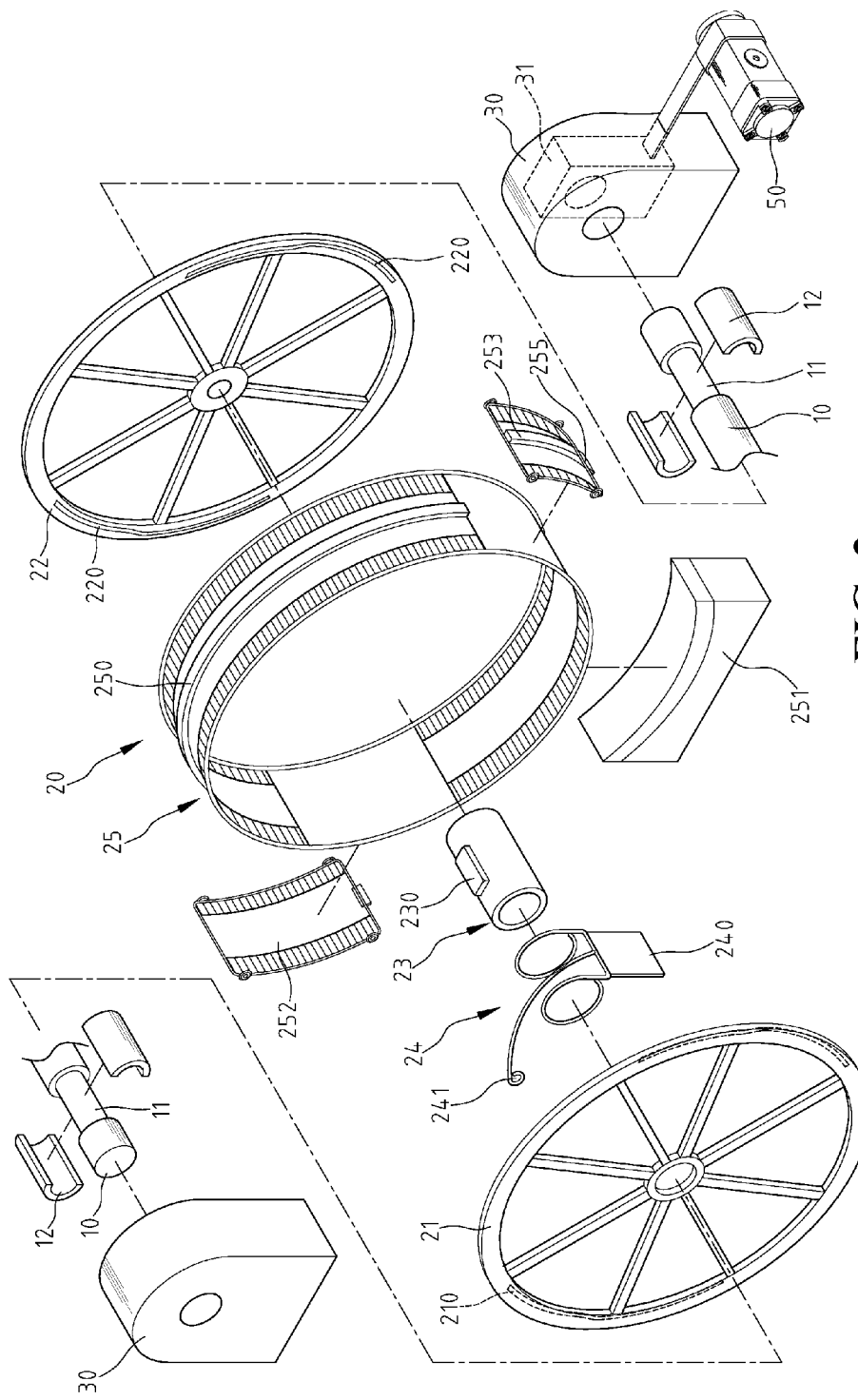
FIG. 2 is an exploded perspective view of the gravitational electric power generating device according to the first preferred embodiment of the present invention.

FIG. 1 is a perspective view of a gravitational electric power generating device according to a first preferred embodiment of the present invention. FIG. 2 is an exploded perspective view of the gravitational electric power generating device, according to the first preferred embodiment of the present invention. As illustrated in the above figures in the first embodiment of the present invention, the gravitational electric power generating device includes a driving shaft 10, a spinning wheel 20, and two mount assemblies 30. On the two ends of the driving shaft 10, there are a plurality of grooves 11 and magnets 12 in the grooves 11. The spinning wheel 20 has a first spoke rim 21, a second spoke rim 22, a wheel hub 23, and a tread-wheel 25. The first spoke rim 21 and the second spoke rim 22 are disposed at the two sides of the tread-wheel 25 individually, and have a plurality of snap-fit tracks 210, 220 on the inner sides of the spoke rims 21, 22. The front draw-gate 252 and the back draw-gate 253 are established on the tread-wheel 25 at predetermined locations and have a plurality of sliding wheels 254, which are lock-fit within the snap-fit tracks 210, 220, and can slide within the snap-fit tracks 210, 220. There is also an automatic locking device 255 on the front draw-gate 252 and the back draw-gate 253. When the front draw-gate 252 and the back draw-gate 253 are in closed state, they are locked tightly by the automatic locking device 255, and cannot slide and become loose when the spinning wheel 20 is rotating. The wheel hub 23 is located between the first spoke rim 21 and the second spoke rim 22, and is disposed in the center of the two spoke rims 21, 22. The wheel hub 23 has a holding device 230 and is wrapped on the driving shaft 10 in a rotating manner. A positioning device 24 is wrapped on the wheel hub 23 and has a positioning plate 240 and a lure device 241. The two mount assemblies 30 are erected at the two ends of the driving shaft 10, respectively, and can support the driving shaft 10 and the spinning wheel 20 on the driving shaft 10. The holding device 230 of the wheel hub 23 is for clamping the driving shaft 10. When the holding device 230 is in the unclamping state, the spinning wheel 20 is to rotate around the driving shaft 10 freely. When the holding device 230 is in the clamping state, the spinning wheel 20 is able to drive the driving shaft 10 to rotate simultaneously. Using a moving object, which has a certain amount of weight, to move in the tread-wheel 25 of the spinning wheel 20, and making use of the gravitational effect of the moving object, the spinning wheel 20 is able to drive the driving shaft 10 to rotate. The mount assemblies 30 have a power conversion module 31, and connected with an electric generator 50, and the rotational inertia of the driving shaft 10 is transmitted to the electric generator 50 to generate the electric power using the power conversion module 31.

Figure 3B:
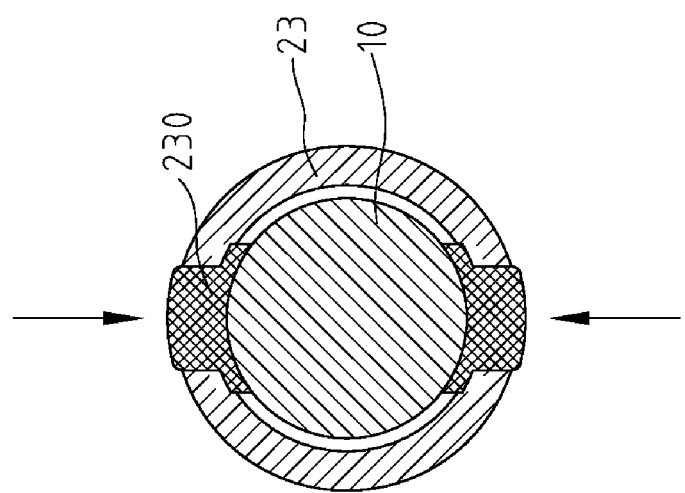
FIG. 3B is a lateral cross-sectional view showing the wheel hub of the gravitational electric power generating device in clamping state, according to the present invention.
Figure 3A:
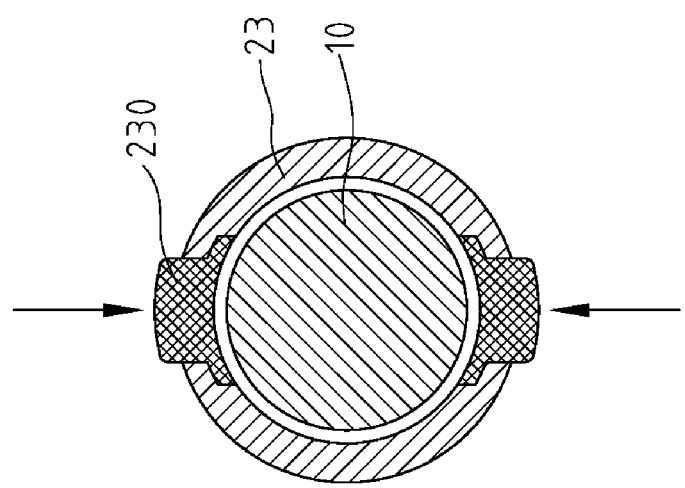
FIG. 3A is a lateral cross-sectional view showing a wheel hub of the gravitational electric power generating device in unclamping state, according to the present invention.

FIG. 3A is a lateral cross-sectional view showing the wheel hub of the gravitational electric power generating device in unclamping state, according to the present invention. When the holding device 230 of the wheel hub 23 is in the unclamping state, the holding device 230 is departed from the surface of the driving shaft 10; therefore, the wheel hub 23 and the driving shaft 10 can rotate correspondingly. As a result, the spinning wheel 20 can rotate freely on the driving shaft 10. FIG. 3B is a lateral cross-sectional view showing the wheel hub in the clamping state. When the holding device 230 of the wheel hub 23 is in the clamping state, the holding device 230 is form-fitted tightly onto the surface of the driving shaft 10, so that the wheel hub 23 is able to drive the driving shaft 10 to rotate simultaneously as it rotates. Therefore, when the spinning wheel 20 rotates, it is also able to drive the driving shaft 10 to rotate simultaneously.

Figure 4:
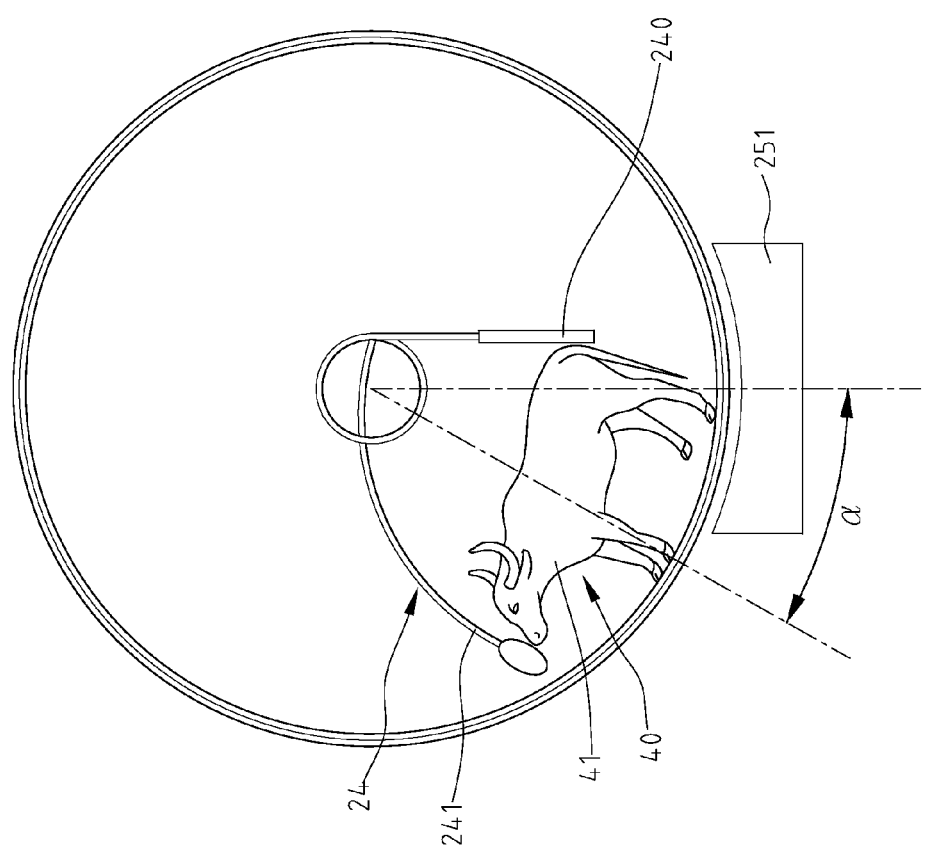
FIG. 4 is an illustrative schematic view showing a positioning device of the gravitational electric power generating device when in use, according to the present invention.

FIG. 4 is an illustrative schematic of the positioning device of the gravitational electric power generating device in use, according to the present invention. The positioning device 24 is hanged on the wheel hub 23, and has a positioning plate 240 and a lure device 241. The purpose of using the positioning plate 240 is for positioning the moving object (for example, a cow 41 in FIG. 4) in the tread-wheel 25 to an optimal position. The angle between the positioning plate 240 and the vertical axis is about 40 degrees, and the gravitational effect can work at the optimal working angle, so as to increase the overall effectiveness. The purpose of the lure device 241 is to entice the animal (the cow 41 as illustrated in FIG. 4) to move forward, and thereby driving the spinning wheel 20 to rotate. Some food or bell can be hanged on the lure device 241 to entice the animal.

Figure 5:
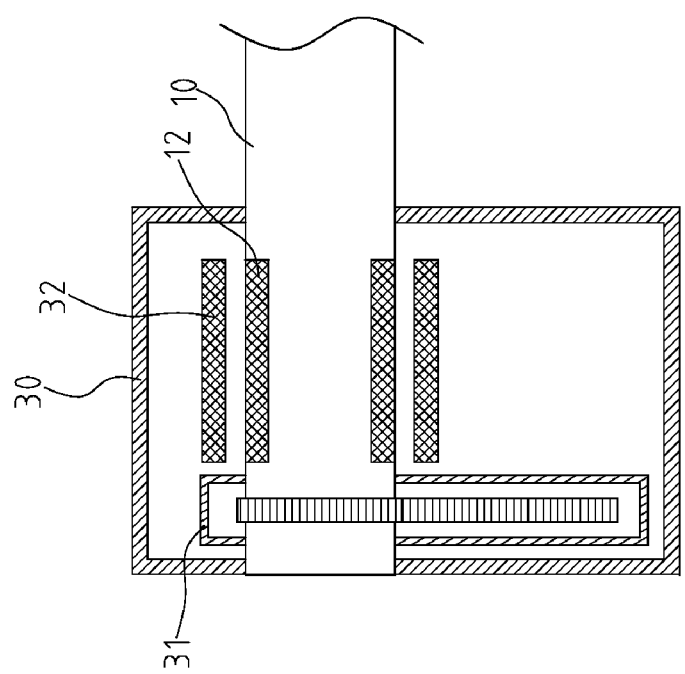
FIG. 5 is a cross-sectional view of a magnetic floating device in a load-supporting block of the gravitational electric power generating device, according to the present invention.

FIG. 5 is a cross-sectional view of the magnetic floating device in the load-supporting blocks of the gravitational electric power generating device, according to the present invention. In the present invention, inside the gravitational electric power generating device, magnetic floating devices are disposed both in the tread-wheel 25 of the spinning wheel 20 and in the two ends of the driving shaft 10. Referring to FIG. 2, there is a magnetic ring 250 on the exterior of the surface of the tread-wheel 25, and there is a magnetic base 251 on the exterior of the lower parts of the tread-wheel 25. It is the repulsion magnetism between the magnetic ring 250 and the magnetic base 251 that can afford a certain upward lifting force to the spinning wheel 20, for reducing the frictional resistance because of the weight of the entire assembly during rotation. Moreover, as illustrated in FIG. 5, the groove 11 is set in the place where the two ends of the driving shaft 10 is fixed to the mount assemblies 30, and having the magnets 12 in the groove 11. The magnetic element 32, which is repelling to the magnet 12, is set up at the exterior of the groove 11. Thus, the frictional force between the driving shaft 10 and the mount assemblies 30 because of the weight of the driving shaft 10 is reduced.

Figure 6A:
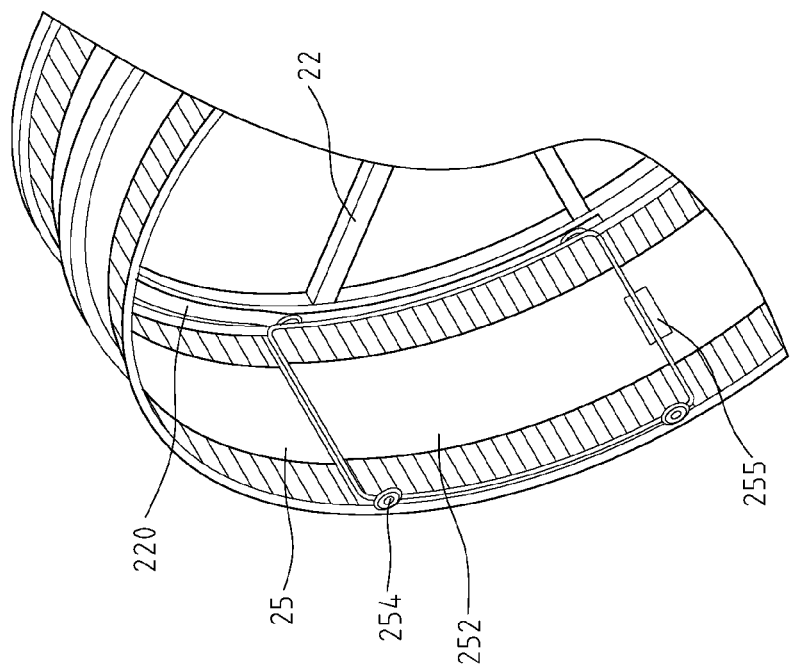
FIG. 6A is an enlarged perspective view of a front draw-gate of the gravitational electric power generating device, according to the present invention.
Figure 6B:
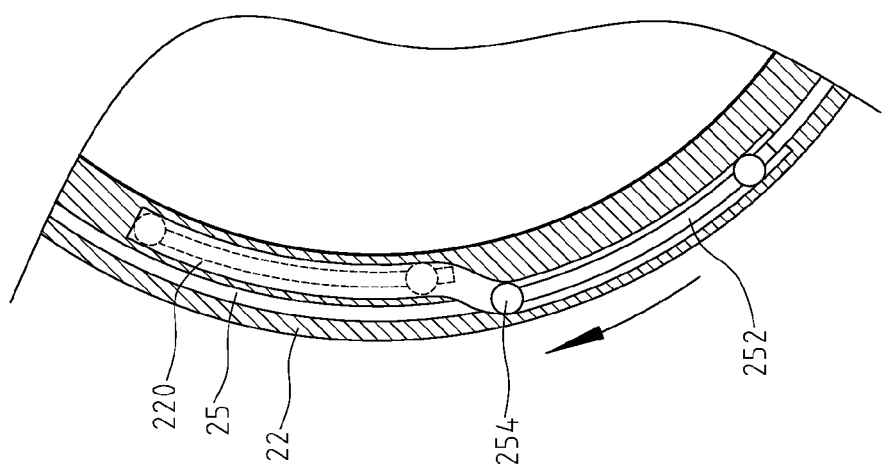
FIG. 6B is an enlarged cross-sectional view of the front draw-gate and a back draw-gate of the gravitational electric power generating device when in open state, according to the present invention.

FIG. 6A is an enlarged perspective view of the front draw-gate of the gravitational electric power generating device, according to the present invention. FIG. 6B is an enlarged cross-sectional view of the front draw-gate and the back gate of the gravitational electric power generating device in open state, according to the present invention. Referring to FIGS. 6A and 6B, when the first spoke rim 21 and the second spoke rim 22 are located on the two sides of the tread-wheel 25, respectively, the sliding wheels 254 of the front draw-gate 252 and the back draw-gate 253 are clamped in, respectively, and can slide in the snap-fit tracks 210, 220. When in closed state, the automatic locking device 255 can lock up the front draw-gate 252 and the back draw-gate 253 tightly. To open the front draw-gate 252 and the back draw-gate 253, the automatic locking device 255 should first be opened, and then the front draw-gate 252 and the back draw-gate 253 are slide upward along the snap-fit tracks 210, 220 to the open position. As a result, the automatic locking device 255 can lock the front draw-gate 252 and the back draw-gate 253 in open position, so that the front draw-gate 252 and the back draw-gate 253 remain open. The worker can be permitted to come into the gravitational electric power generating device to clean, repair, and to replace moving parts.

Figure 7:
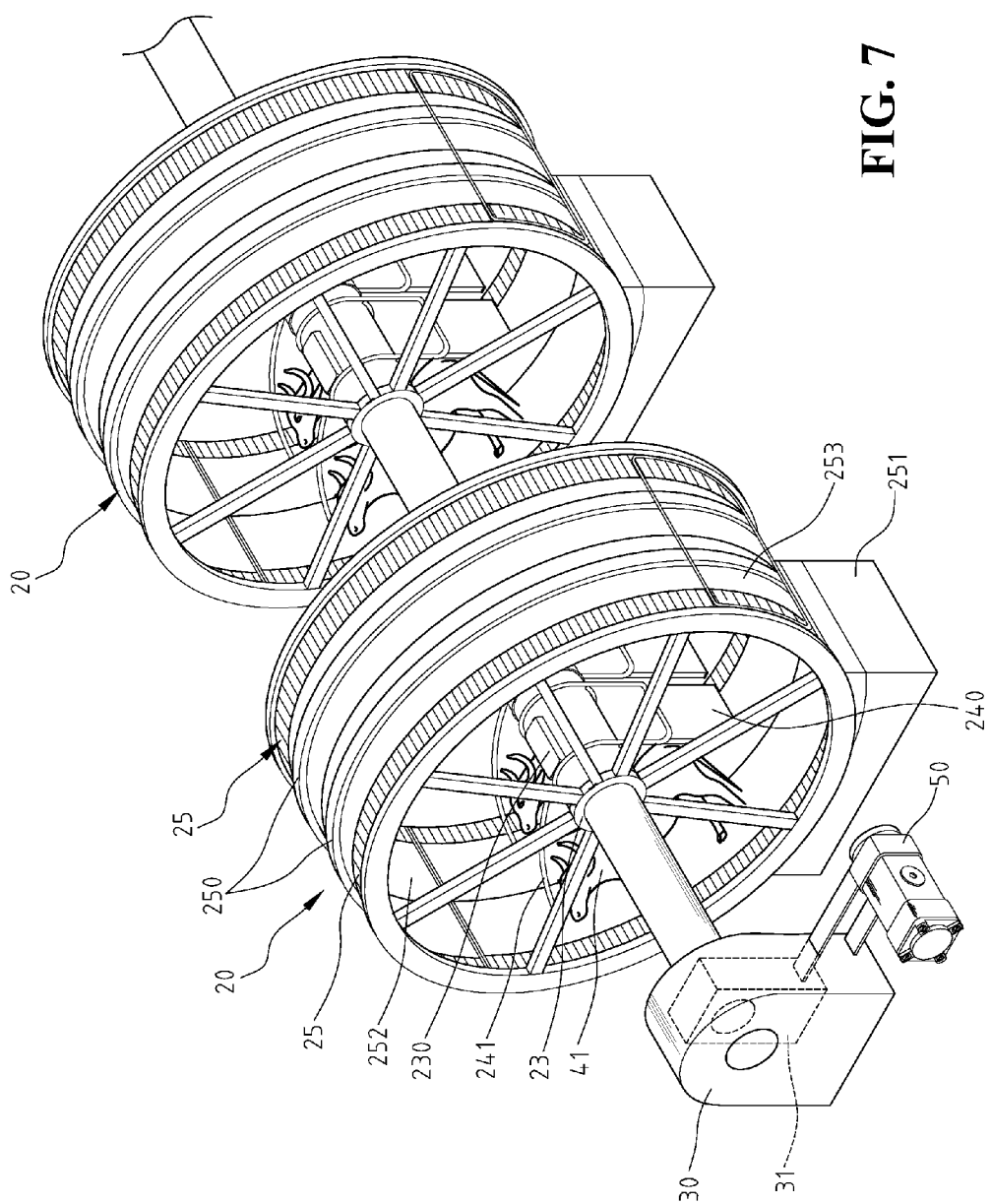
FIG. 7 is a perspective view of a gravitational electric power generating device, according to a second preferred embodiment of the present invention.

FIG. 7 is a perspective view of the gravitational electric power generating device, according to the second preferred embodiment of the present invention. In FIG. 7, according to the second preferred embodiment of the present invention, the gravitational electric power generating device includes a driving shaft 10, a spinning wheel 20, and two mount assemblies 30. On the two ends of the driving shaft 10, there are the grooves 11 and the magnets 12 in the grooves 11. The second preferred embodiment of the present invention has fifteen sets of the spinning wheels 20. Each of the spinning wheels 20 has a first spoke rim 21, a second spoke rim 22, a wheel hub 23, and two tread-wheels 25. Two tread-wheels 25 are connected to each other. The first spoke rim 21 and the second spoke rim 22 are disposed at the two sides of the tread-wheel 25 individually, and have the snap-fit tracks 210, 220 on the surface of the interior. The front draw-gate 252 and the back draw-gate 253 are established on the tread-wheel 25 at the predetermined locations, and have the sliding wheels 254, which are lock-fit within the snap-fit tracks 210, 220, and can slide within the snap-fit tracks 210, 220. There is also an automatic locking device 255 on the front draw-gate 252 and the back draw-gate 253. When the front draw-gate 252 and the back draw-gate 253 are in closed state, they are locked tightly by the automatic locking device 255, and cannot slide and become loose when the spinning wheel 20 is rotating. The wheel hub 23 is located between the first spoke rim 21 and the second spoke rim 22, and is disposed in the center of the two spoke rims, 21 & 22. The wheel hub 23 has a holding device 230 and is wrapped on the driving shaft 10 in a rotating manner. A positioning device 24 is wrapped in the wheel hub 23 and has a positioning plate 240 and a lure device 241. The two mount assemblies 30 are erected at the two ends of the driving shaft 10, respectively, and can support the driving shaft 10 and the spinning wheel 20 on the driving shaft 10. The holding device 230 of the wheel hub 23 is for clamping the driving shaft 10. When the holding device 230 is in the unclamping state, the spinning wheel 20 is to rotate around the driving shaft 10 freely. When the holding device 230 is in the clamping state, the spinning wheel 20 is able to drive the driving shaft 10 to rotate simultaneously. Using two cows 20 to move in the tread-wheel 25 of the spinning wheel 20, and making use of the gravitational effect of the cows, the spinning wheel 20 is able to drive the driving shaft 10 to rotate. The mount assemblies 30 have a power conversion module 31, which is connected with an electric generator 50, and the rotational inertia of the driving shaft 10 is transmitted to the electric generator 50 to generate the electric power using the power conversion module 31.

The positioning device 24 is hanged on the wheel hub 23, and has a positioning plate 240 and a lure device 241. The purpose of using the positioning plate 240 is for positioning the cow 41 in the tread-wheel 25 at the optimal driving position. The angle between the positioning plate 240 and the vertical axis is about 40 degrees, and the gravitational effect can work at the optimal working angle, so as to increase the overall effectiveness. The purpose of the lure device 241 is to entice the animal to move forward, and thus to drive the spinning wheel 20 to rotate. The food or the bell can be hanged on the lure device 241 to entice the animal. There is a magnetic ring 250 on the exterior of the surface of the tread-wheel 25, and there is a magnetic base 251 on the exterior of the lower parts of the tread-wheel 25. It is using the magnetic repulsion between the magnetic ring 250 and the magnetic base 251 that provides a certain upward lifting force to the spinning wheel 20, for reducing the frictional resistance because of the weight of the entire assembly during rotation. Moreover, the grooves 11 are disposed at the two ends of the driving shaft 10, which are assembled to the inside of the mount assemblies 30, and having the magnets 12 in the groove 11. The magnetic element 32, which repels the magnet 12, is set on the exterior of the groove 11. Thus, the frictional force between the driving shaft 10 and the mount assemblies 30 due to weight of the driving shaft 10 is reduced. When one set of spinning wheels 20 within the 15 sets of the spinning wheels 20 is damaged or the cows 41 are tired and needed to be replaced, the holding device 230 can be opened and released from the clamped/locked state. The spinning wheel 20 and the driving shaft 10 are disengaged from coupling together and are stopped from rotating temporarily. Thus a worker is able to enter the power-generating device for cleaning, and repairing of the device, and for changing the cow, so that the device can be maintained in working condition. The entire plurality of sets of devices will not stop because one set of spinning wheels 20 has breakdown or that the cows are tired. Furthermore, in the second preferred embodiment of the present invention, 30 of the cows 41 can work at the same time. The daily food intake of each cow costs approximately US$2.20, and all the food for the cows costs US$66 per day. However, the power-generating rate according to the present invention is quite huge, and it is three times as much as the power generating rate of a small hydroelectric power station. Its economic efficiency is extremely large.

Figure 8:
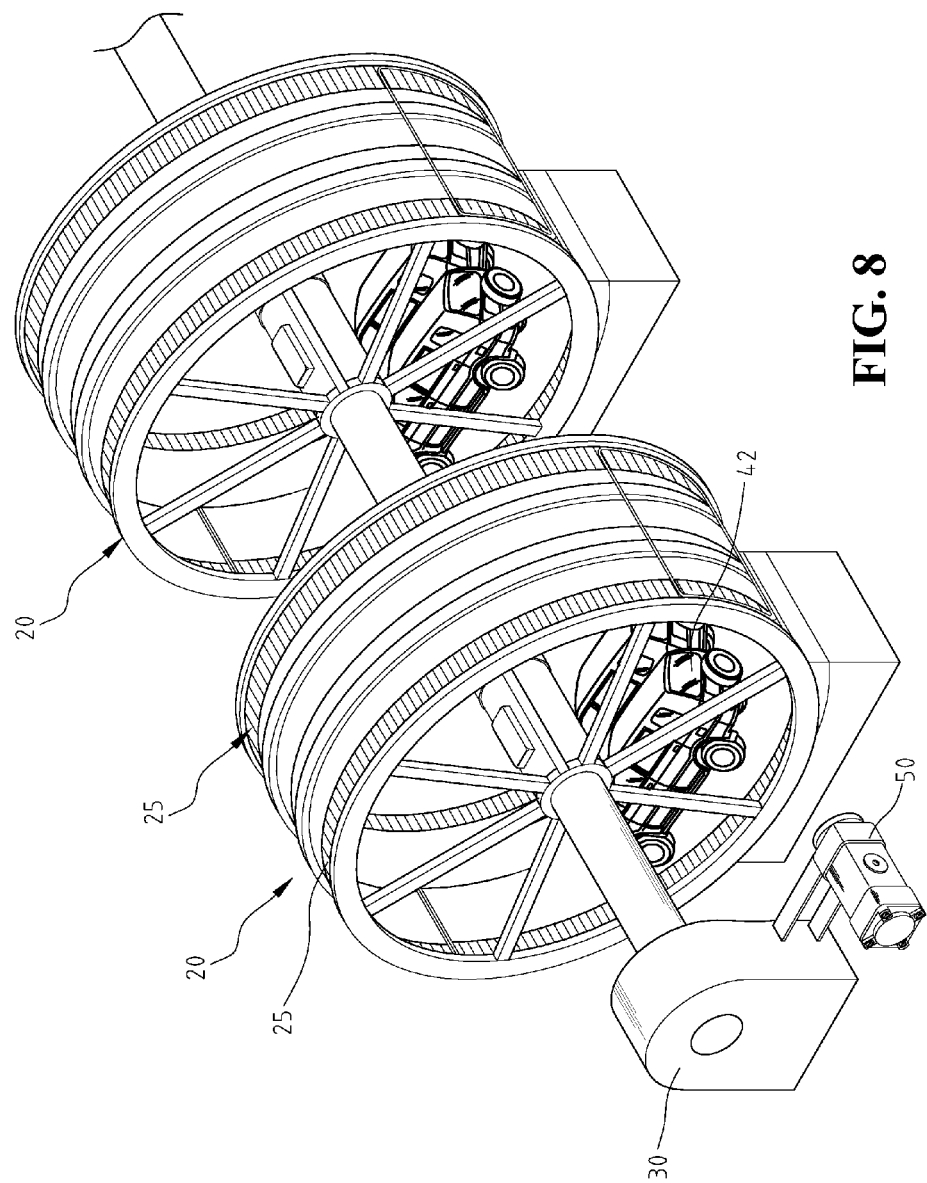
FIG. 8 is a perspective view of a gravitational electric power generating device, according to a third preferred embodiment of the present invention.

FIG. 8 is a perspective view of a gravitational electric power generating device, according to a third preferred embodiment of the present invention. In FIG. 8, the driving vehicle 42 or the other moving objects are used for replacing the cow 41, and able to eliminate the problem of having to clean animal feces.

So, for the present invention of the gravitational electric power generating device, not only the production cost is inexpensive, the service is also convenient, and the power generating rate is huge, but also the pollution is lower and it also possess environmental friendly benefits. Furthermore, it is not influenced by the environmental factors, and can generate electricity continually. Therefore, the described invention conforms extremely well to the current needs for electricity generation.

Although the present invention has been described with reference to the preferred embodiment thereof, it is apparent to those skilled in the art that a variety of modifications and changes may be made without departing from the scope of the present invention which is intended to be defined by the appended claims.

What is claimed is:

1. A gravitational electric power generating device, comprising:
 a driving shaft;
 at least one spinning wheel, wherein each of the spinning wheel has a first spoke rim, a second spoke rim, a wheel hub, and at least a tread-wheel, and the first spoke rim and the second spoke rim are separately disposed at the outermost sides of the tread-wheel, and the wheel hub is located between the first spoke rim and the second spoke rim, and is disposed in the center of the two spoke rims, and the wheel hub has a holding device and is wrapped on the driving shaft in a rotating manner; and
 two mount assemblies erected at the two ends of the driving shaft, respectively, for supporting the driving shaft and the spinning wheel on the driving shaft;
 wherein the holding device of the wheel hub is to clamp the driving shaft, and when the holding device is in the unclamping position, the spinning wheel is able to rotate around the driving shaft freely, and when the holding device is in the clamping state, the spinning wheel is able to drive the driving shaft to rotate simultaneously, and using a moving object, which has a certain amount of weight, to move in the tread-wheel of the spinning wheel, and making use of the gravitational effect of the moving object, the spinning wheel is able to drive the driving shaft to rotate, and the mount assemblies have a power conversion module which is connected to an electric generator, and the rotational inertia of the driving shaft is transmitted to the electric generator to generate the electric power by the power conversion module.

2. The gravitational electric power generating device as claimed in claim 1, wherein a front draw-gate and a back draw-gate are set up at a plurality of predetermined positions on the tread-wheel.

3. The gravitational electric power generating device as claimed in claim 1, wherein the moving object is an animal.

4. The gravitational electric power generating device as claimed in claim 1, wherein the moving object is a motor vehicle.

5. The gravitational electric power generating device as claimed in claim 3, wherein the wheel hub has a positioning device to locate the animal to the most proper moving position and to entice the animal to move forward.

6. The gravitational electric power generating device as claimed in claim 1, further comprising a plurality of magnetic floating parts disposed on the driving shaft and the tread-wheels, respectively.

* * * * *